United States Patent [19]

McCann et al.

[11] Patent Number: 4,607,261

[45] Date of Patent: Aug. 19, 1986

[54] INK SUPPLY CARTRIDGE AND COOPERATIVE INK CIRCULATION SYSTEM OF CONTINUOUS INK JET PRINTER

[75] Inventors: James D. McCann, Waynesville; Michael J. Piatt, Enon; Theodore F. Williams, Beavercreek, all of Ohio

[73] Assignee: Eastman Kodak Company, Rochester, N.Y.

[21] Appl. No.: 722,548

[22] Filed: Apr. 12, 1985

[51] Int. Cl.[4] .......... G01D 15/18

[52] U.S. Cl. .......... 346/75; 346/140 R

[58] Field of Search .......... 346/75, 140 R

[56] References Cited

U.S. PATENT DOCUMENTS

| | | | |
|---|---|---|---|
| 4,320,407 | 3/1982 | Goldis et al. | 346/140 R |
| 4,340,896 | 7/1982 | Cruz-Uribe et al. | 346/140 R |
| 4,399,446 | 8/1983 | McCann et al. | 346/140 R |
| 4,413,267 | 11/1983 | Hein | 346/75 |
| 4,460,904 | 7/1984 | Oszczakiewicz et al. | 346/75 |
| 4,494,124 | 1/1985 | Piatt et al. | 346/1.1 X |

*Primary Examiner*—E. A. Goldberg
*Assistant Examiner*—Gerald E. Preston
*Attorney, Agent, or Firm*—John D. Husser

[57] ABSTRACT

An ink cartridge constructed for insertion into a continuous ink jet printer, includes a reservoir for containing an ink supply, an outlet for coupling the ink reservoir to a printer supply line, cartridge venturi elements having (i) a restriction region, (ii) an expansion region and (iii) an inlet for detachable coupling to an ink bypass line of such printer. The cartridge also includes an ink return inlet couplable to an ink return line(s) of the printer and a path defining an ink induction passage that extends from the venturi restriction region to the ink return inlet. Structural features of printer apparatus, adapted to cooperate with such a cartridge, are also disclosed.

16 Claims, 11 Drawing Figures

INK SUPPLY CARTRIDGE AND COOPERATIVE INK CIRCULATION SYSTEM OF CONTINUOUS INK JET PRINTER

BACKGROUND OF THE INVENTION

1. Field of the Invention

The present invention relates to ink jet printing apparatus of the continuous type and more specifically to features of a simplified ink circulation system (e.g. including an ink supply cartridge and ink circulation means) in such printing apparatus.

2. Description of the Prior Art

In continuous ink jet printing apparatus streams of uniformly spaced ink drops are created by imposing predetermined vibrations upon liquid ink filaments issuing from an orifice plate. The filaments are formed by supplying ink under pressure to a print head cavity that is in communication with the orifice plate. Information is imparted to the droplet streams by selective non-charging or charging and deflection of droplets. A portion of the droplets pass to the recording medium but there are a substantial number of non-printing droplets which are intercepted by a catcher for recirculation. Often the print head cavity has an outlet other than the orifice plate (e.g. to facilitate dynamic pressure control within the cavity at start-up), and the apparatus ink supply system also circulates such ink flow.

The uniformity of the stream of ink droplets is dependent upon maintaining the orifice plate structure clear of obstructions, e.g. unwanted particles ink the ink, and upon a uniform pressure in the print head cavity; and these are important concerns in the ink supply system. It is also important that recirculating ink be returned to the supply reservoir reliably. For example, if ink intercepted by the catcher is not reliably withdrawn to the ink supply, an accumulation of ink in the catcher region can impede the path of printing drops.

Heretofore the ink circulation systems in continuous ink jet printing apparatus have been fairly complex and large in size. A typical approach was to provide a supply pump, under the control of upstream detection and feedback, to assure proper dynamic print head pressure and to employ a separate vacuum pump for drawing ink back to the supply reservoir (e.g. from the catcher or print head outlet).

Concurrently filed U.S. patent application Ser. No. 06/722,550, entitled "Ink Circulation System for Continuous Ink Jet Printing Apparatus" discloses a simplified ink circulation approach which provides a vented ink reservoir and means located along the ink circulation path for creating, from the dynamics of the ink flow, a reduced pressure region(s) to withdraw ink from the catcher and/or print head outlet. This unique approach avoids the ink evaporation (and resulting viscosity change) caused by a vacuum pump continuously withdrawing air over the ink in a supply reservoir. This approach also obviates the need for a separate vacuum pump and the additional cost, complexity, size and energy usage incident thereto.

SUMMARY OF THE INVENTION

The present invention provides further improvements in ink circulation systems of continuous ink jet printers, which follow the general approach of said U.S. application Ser. No. 06/722,550, and provide further advantages over the large and complex ink supply and circulation systems of the prior art. For example, the present invention provides operationally improved embodiments utilizing that approach. The present invention also provides improvements in regard to overall printer compactness and in enhancing the ink circulation system's reliability. In accord with one more particular feature, certain operative parts of the circulation system that are subject to frequent service replacement or repair are embodied in unique, customer-replaceable ink supply cartridges.

In one aspect the present invention constitutes a unique ink cartridge for insertion and removal with respect to continuous ink jet printer apparatus. The ink cartridge has wall means that define an ink supply reservoir, means for venting the supply reservoir, outlet means for detachably coupling ink in the supply reservoir to a printer supply line and venturi means having a restriction region and an expansion region. A first cartridge inlet is constructed for detachable coupling with an ink bypass line of the printer, and a second cartridge inlet is constructed for detachable coupling with an ink return line(s) of the printer. The cartridge has means defining an ink induction passage from the restriction region of the venturi to its ink return inlet so that the reduced pressure generated by the ink flow from the printer bypass line withdraws ink from the printer return line(s). In other aspects the present invention provides ink jet printing apparatus constructed to cooperate with such a cartridge and an ink circulation system employing such cartridge and printer apparatus.

BRIEF DESCRIPTION OF THE DRAWINGS

The subsequent description of preferred embodiments of the invention refers to the attached drawings wherein.

DESCRIPTION OF THE PREFERRED EMBODIMENTS

Figure 1:
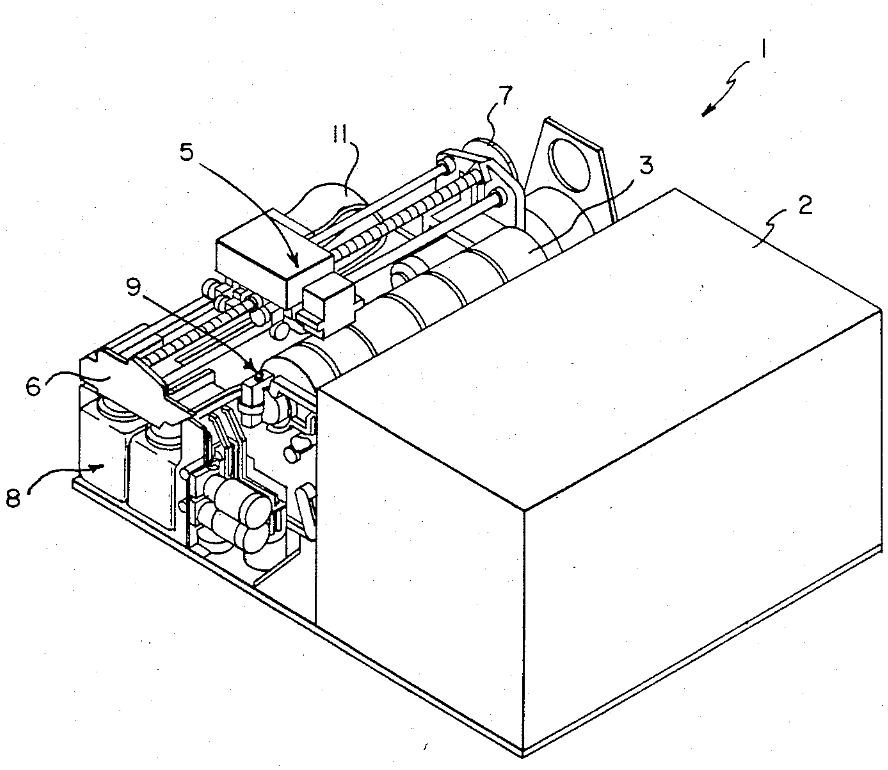
FIG. 1 is a perspective view of one continuous ink jet printer apparatus in which the present invention is useful.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute an essential part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits, not shown in FIG. 1, which are coupled to ink supply cartridges 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the apparatus cycle.

Figure 2:
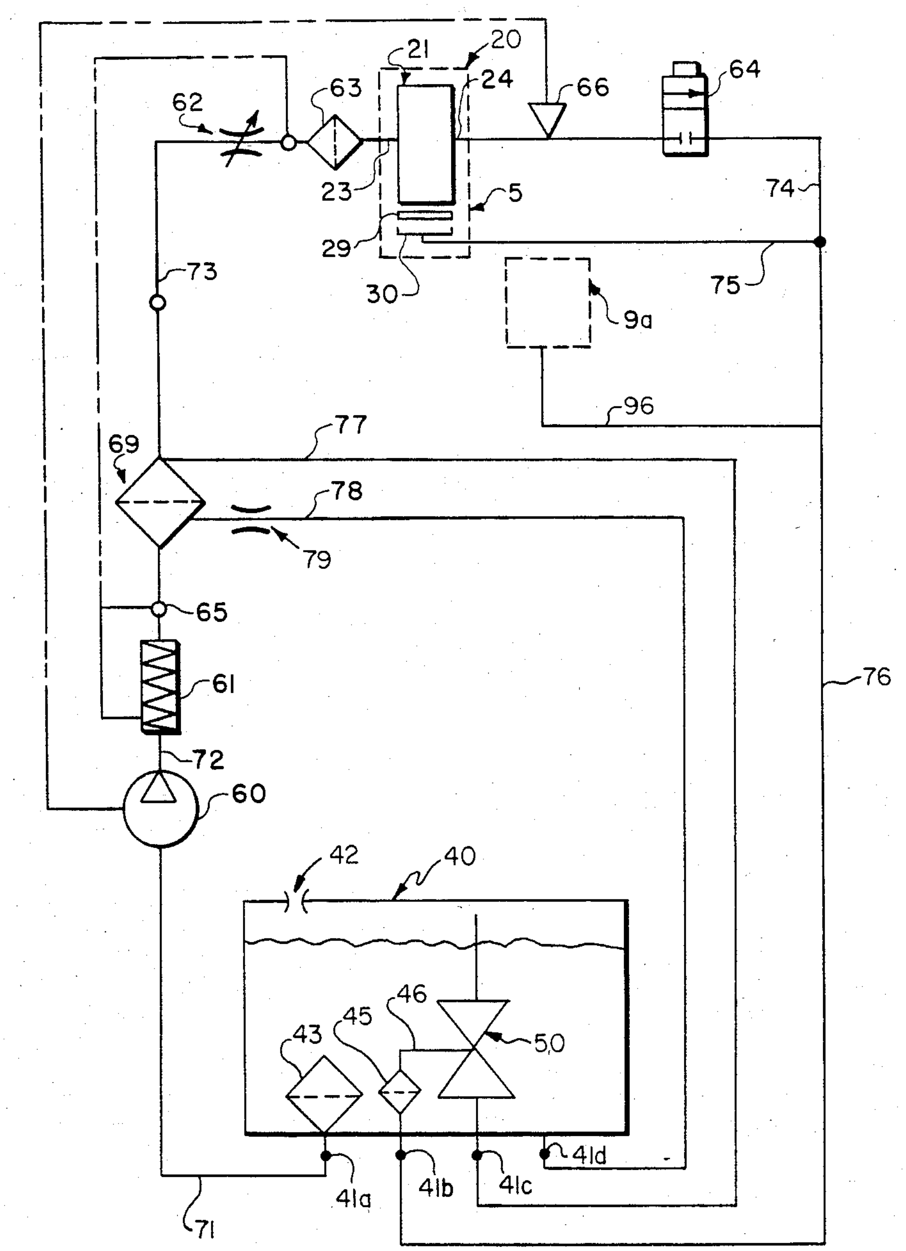
FIG. 2 is a schematic illustration of one preferred ink supply cartridge and circulation system in accord with the present invention.
Figure 8:
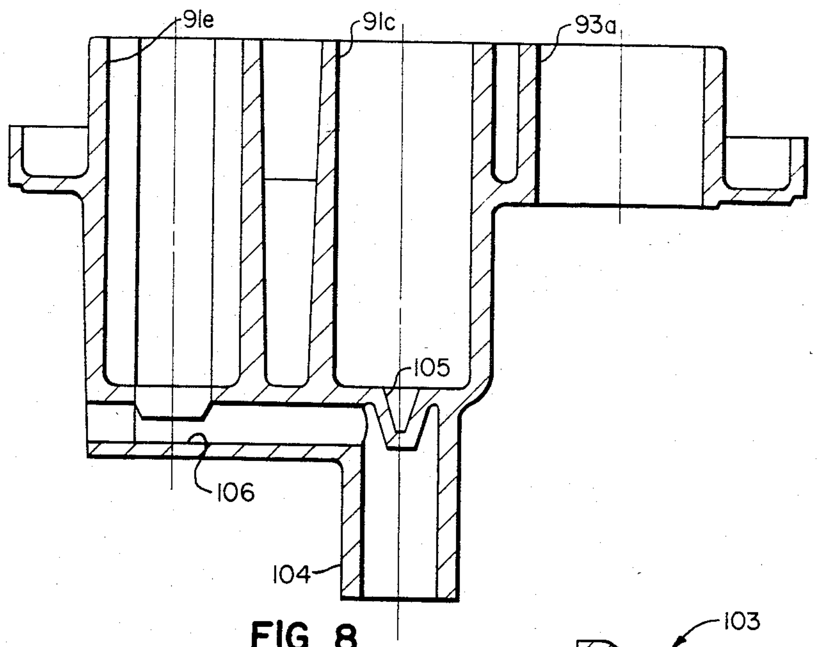
FIG. 8 is a cross-sectional view of that cartridge upper portion taken along the lines VIII—VIII of FIG. 6.
Figure 11:
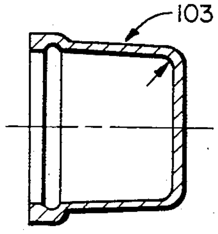
FIG. 11 is a cross-sectional view of the diffuser cap portion shown in FIG. 5.

Referring to the schematic diagram of FIG. 2, the print head assembly 5 includes an upper portion 20 and a lower portion 30. The upper portion 20 can include a print head body 21 having an inlet 23 for receiving ink. The body 21 can comprise a passage leading to a print head cavity, the orifice plate structure of the printer (not shown) and the print head outlet 24. The upper print head portion also includes a suitable transducer means (not shown) for imparting mechanical vibration to the body. Such transducer can take various forms known in the art for producing periodic perturbations of the ink filament(s) issuing from the orifice plate to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982, now CIP, Ser. No. 06/777,102 filed Sept. 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 29 constructed to impart desired charge upon ink droplets at the point of filament break-up and a drop catcher 30 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983, now abandoned, further filed as CIP, Ser. No. 06/696,682, now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful.

During the printing operation ink filaments are ejected through the orifices in plate and, under the influence of the transducer on body, break up into streams of uniformly sized and spaced droplets. The charge plate is located proximate the zone of filament break-up and is adapted to selectively charge or not charge each droplet in each of the streams in accordance with information signals respectively transmitted to the various charge sectors of the charge plate. The charged droplets are deflected to catcher 30 for recirculation back to the ink print head, while uncharged droplets pass on to the print substrate. It is preferred that the catcher assembly be constructed so that ink is removable therefrom by a relatively small, e.g. 10–25 inches of $H_2O$, negative pressure.

One ink supply and circulation system in accord with one embodiment of the present invention is shown in FIG. 2 and includes various ink conduits or "lines" which form the ink circulation path. Specifically, pump inlet line 71 extends from ink supply cartridge 40 to the inlet of pump 60, pump outlet line 72 extends between pump 60 and main filter 69, head supply line 73 extends from main filter 69 to the print head inlet and head return line 74 extends from the print head outlet to a junction between catcher return line 75 and the main ink return line 76. An air bleed line 78 extends from main filter 61 back to cartridge 40 and an ink bypass line 77 extends from a juncture with line 73 also back to cartridge 40. As will be clear from the subsequent description, the present invention is not limited to use with the particular ink circulation line arrangement shown in FIG. 2. Other elements of the FIG. 2 embodiment such as ink heater 61, variable flow restrictor 62, final filter 63, head return valve 64, temperature sensor 65 and pressure sensor 66 are not necessary for the practice of the present invention, but can be usefully incorporated with it.

Figure 3:
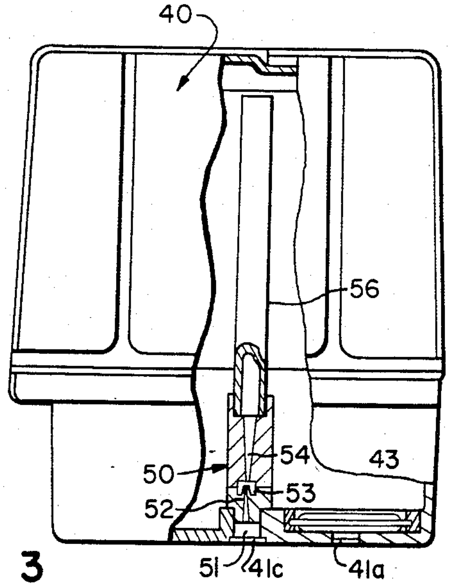
FIG. 3 is a front view, with portions broken away, of one ink cartridge embodiment in accord with the present invention.

Considering now the inventive aspects of the ink supply and circulation system, and referring to FIG. 3 as well as FIGS. 1 and 2, it can be seen that cartridge 40 is constructed to be readily inserted and removed, as a unit, from operative relation with lines of the ink circulation system. For this purpose suitable couplings **41*a*, 41*b*, 41*c* and 41*d* are formed on the cartridge 40 in a manner so as to be operatively couplable with lines 71, 76, 77 and 78 upon insertion of the ink cartridge 40 into its mounting in the printer apparatus. Cartridge 40 has a suitable venting means 42 in its wall structure that is operable to render the ink supply reservoir portion of its interior at atmospheric pressure. The cartridge 40 also comprises as a unitary portion thereof a prefilter 43, which is located between coupling 41*a* and the cartridge interior to filter ink egressing to pump inlet 71, a venturi means 50 and a venturi filter element 45. The venturi filter portion is formed to filter ink from return line 76 prior to its introduction to venturi induction passage 46, which is also formed as a part of the cartridge 40. The coupling 41*c* is constructed to introduce ink from bypass line 77 into the inlet of the venturi means 50**.

As shown in FIG. 3, the venturi 50 includes an inlet 51, a fluid constriction region 52, high velocity induction region 53 coupled to induction passage 46 and an expansion region 54. The expansion region of the venturi is coupled to a standpipe 56 which extends to the upper portion of the cartridge interior so that ink is introduced above the liquid surface.

In the start-up mode of operation of the FIG. 2 ink circulation system the valve 64 in the head outlet line 74 is open and pump 60 is activated to withdraw ink from the cartridge 40 through line 71. Ink is forced under pressure through the main filter and into head inlet line 73 and bypass line 77. The ink passing into inlet line 73 flows through the print head and into and through the head outlet line 74. The ink passing into bypass line is recirculated back into the inlet of venturi under a positive pressure and generating a reduced pressure in induction passage 46 and return line 76. Ink from the outlet 24 is thus withdrawn back into the cartridge 40 via return line 76, coupling 41*b*, coarse filter 45 and induction passage 46 so as to exit into the cartridge reservoir through the venturi expansion chamber 54 and the standpipe 56.

Heater 61, under the feedback control of sensor 65, conditions the circulating ink to the proper operating temperature and pressure sensor 66 regulates pump 60 to attain the proper ambient line circulation pressure. At this stage valve 64 is closed and ink passing into the print head 20 then issues as ink streams from the orifice plate of the print head. During this start-up sequence, the print head assembly 5 is preferably located over the start-up station 9 so that ink is caught by the sump 9*a* until droplet flight is stabilized into the catcher 30. Ink passing into sump 9*a* during start-up is withdrawn along line 9*b* into return line 74 and passes into the reservoir of cartridge 40 in the same manner as the ink which passed through valve 64.

The normal print operation now commences with some ink printing on the printer record medium and unused ink passing into catcher 30. The flow of ink through bypass line continues and now provides the motive force for withdrawal of ink from catcher 30 along lines 75, 76 and into the cartridge's venturi induction passage 46 to be expelled through standpipe as previously described vis-a-vis the print head outlet ink flow.

Figure 4:
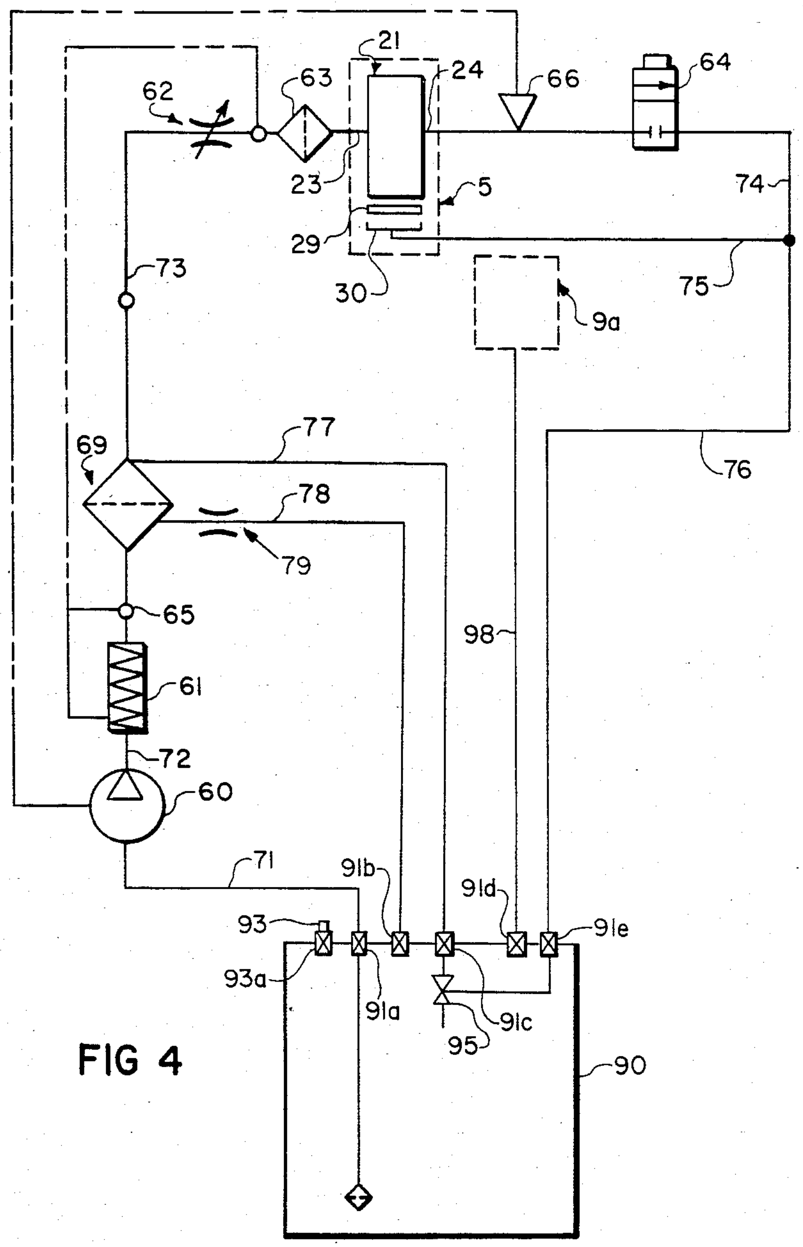
FIG. 4 is a schematic illustration of another preferred ink supply cartridge and cooperative circulation system in accord with the present invention.

FIG. 4 schematically illustrates another embodiment of ink supply cartridge and circulation system in accord with the present invention. Many portions of the FIG. 4 embodiment can be configured as described with respect to FIG. 2 and those portions bear the same identifying numeral as in FIG. 2. However, there are two significant areas of structural difference between the FIG. 2 and FIG. 4 embodiments.

First, the ink supply cartridge 90 has significant differences from the FIGS. 2 and 3 embodiment. As shown in FIG. 4, cartridge 90 has detachable couplings 91*a*, 91*b*, 91*c*, 91*d* and 91*e* located in its top portion. Portion 91*a* is detachably coupled to the pump inlet line 71 of the ink circulation system and the cartridge has an inner conduit 92 extending from coupling 91*a* to a prefilter 99 located at the cartridge bottom. Coupling 91*b* is attachable to filter bleed line 78 and functions to prevent a build-up of air in main filter 69 as described above. Again restrictor 79 in bleed line 78 prevents substantial ink diversion via this conduit. Bypass line 77 is detachably coupled to the inlet of venturi 95 via coupling 91*c* and return line 76 is detachably coupled to the induction passage 96 via coupling 91*e*. In this embodiment venting means 93 are provided in the printer apparatus to cooperate with openable coupling 93*a* of the ink cartridge and vent the cartridge's supply reservoir to atmosphere. The coupling 91*d* of cartridge 90 is attachable to a sump return line 98 and in this embodiment ink is returned to the ink cartridge from the start-up station sump by means of gravity flow through line 98 and inlet coupling 91*d*.

Figure 10:
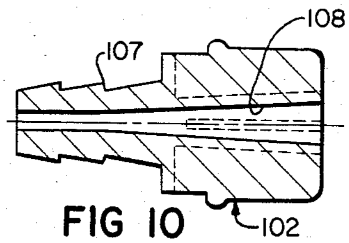
FIG. 10 is a cross-section taken along line X—X in FIG. 9.
Figure 9:
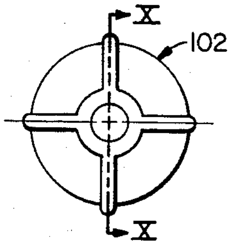
FIG. 9 is an end view of the venturi expansion region portion shown in FIG. 5.
Figure 5:
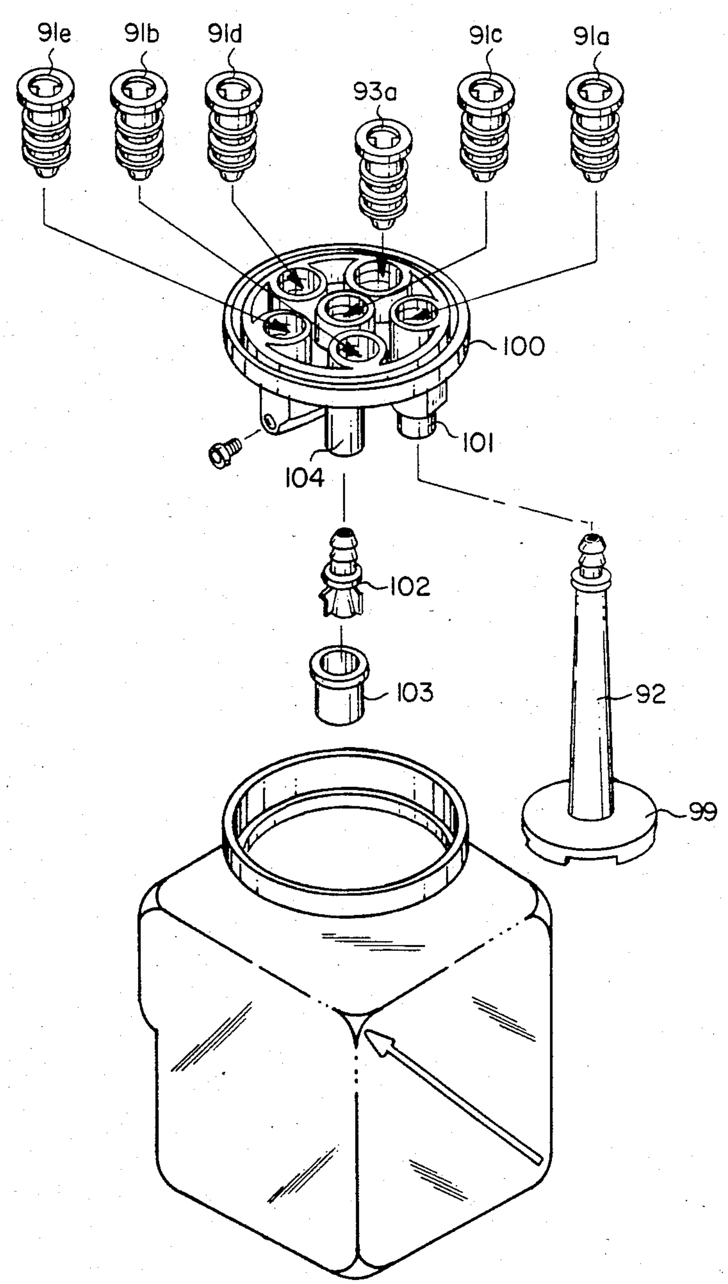
FIG. 5 is a more detailed perspective view of another preferred cartridge construction useful with the embodiment shown in the FIG. 4 system embodiment.
Figure 6:
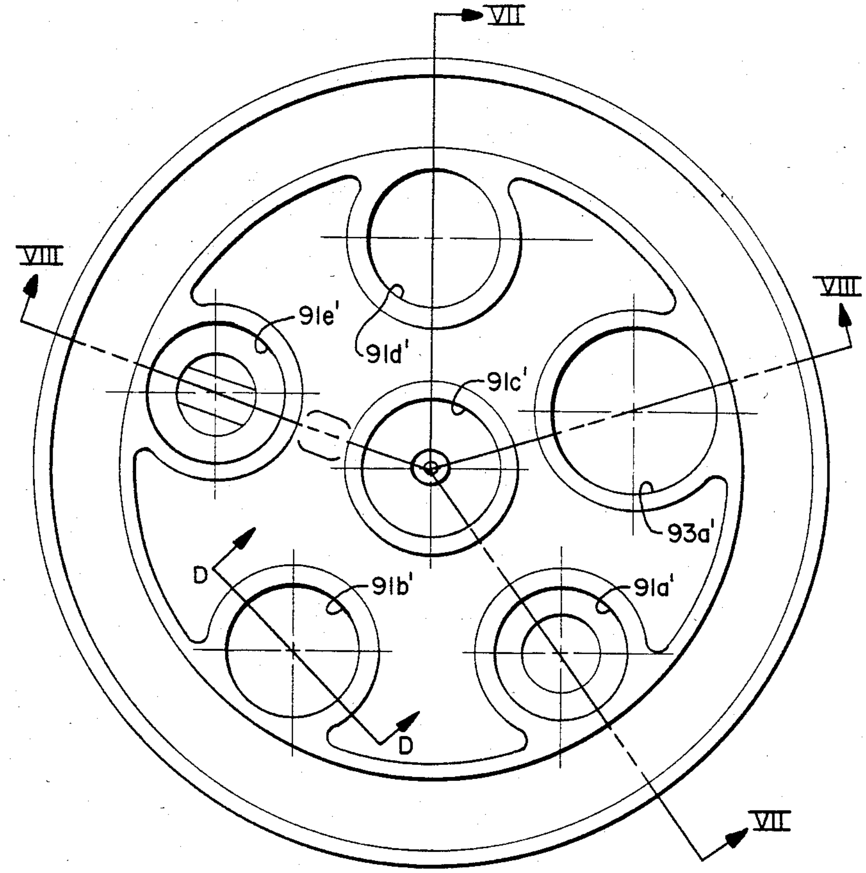
FIG. 6 is an enlarged top view of the upper portion of the FIG. 5 cartridge.
Figure 7:
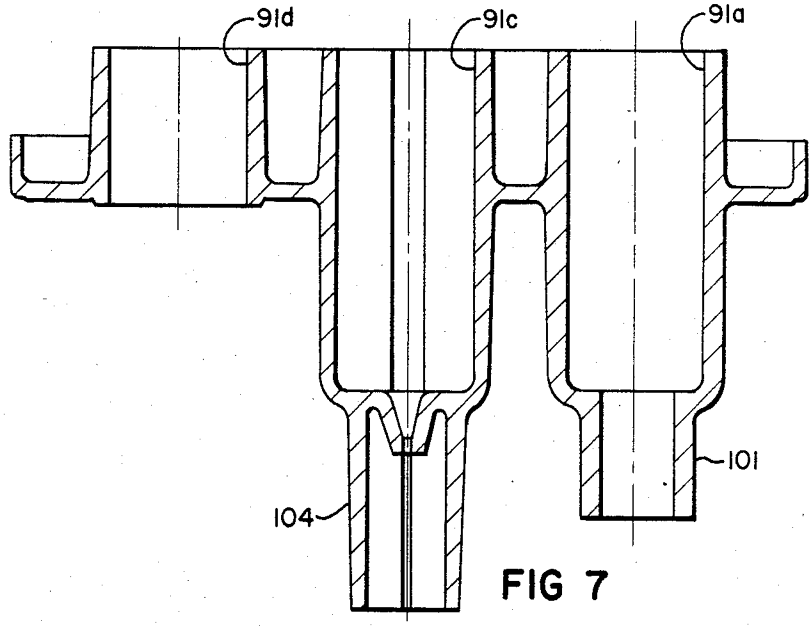
FIG. 7 is a cross-sectional view of that cartridge upper portion taken along the lines VII—VII of FIG. 6.

Further detail of one preferred ink cartridge construction useful in the FIG. 4 embodiment of the invention are illustrated in FIGS. 5–11. In this construction the cartridge 90 comprises a plurality of molded parts which are readily assembled and constitute a unit that is disposable after emptying. Thus cap cartridge 100 provides a plurality of openings 91*a'*, 91*b'*, 91*c'*, 91*d'*, 91*e'* and 93*a'* in which the detachable couplings 91*a*, 91*b*, 91*c*, 91*d* and 91*e* and openable vent means 93*a* are mounted. Those couplings can be constructed to pressure-fit into the openings of cap 100 and the inner conduit and its attached prefilter 99 are constructed to pressure fit onto the inner shoulder 101 of the cap 100. Similarly the mixing chamber and expansion region portion 102 and diffuser cap 103 of the venturi means 95 are constructed to interfit as shown in FIG. 5 into the cap shoulder 104. As shown more clearly in FIG. 8, the restriction region 105 of venturi means 95 and the induction passage 106 leading from inlet 91*e* to the reduced pressure region of the venturi means are molded into the cap structure in a manner such that they are isolated from the atmospheric ink supply reservoir of the cartridge and communicate therewith only via the expansion chamber 102 at its outlet. The detail structure of the mixing chamber and expansion region portion 102 is shown in FIGS. 9 and 10 and its interfitting diffuser cap 103 is shown in cross-section in FIG. 11. It is highly desirable in this configuration to utilize diffuser cap 103 to provide a turbulence created back pressure egressing from the restriction region of the venturi. This creates an attachment of the flowing ink liquid to the walls of the mixing chamber 107 and/or the expansion section 108 and provides the liquid seal (from the atmospheric reservoir interior) that facilitates the pumping action of the venturi means. Thus, the FIG. 4 cartridge embodiment utilizes the diffuser cap to make the short length diffuser self-priming and is particularly desirable for maximizing the ink volume to cartridge size parameters.

The following operational description of the FIG. 4 embodiment of the invention, with exemplary pressure levels at various location within the ink circulation system, will be useful to one skilled in the art in selecting appropriate pump, conduit, restrictor, etc. sizes for practice of the present invention. Thus, in the cross-flow mode, i.e. with valve 64 open and ink flowing through the ink cavity from inlet 23 to outlet 24, a desirable pressure and flow rate condition is as follows:

| | Cross-flow Mode | |
|---|---|---|
| Conduit | Pressure | Flow Rate |
| 71 | −.4 psi | 216 ml/min. |
| 72 | 19 psi | 216 ml/min. |
| 78 | 19 psi | 18 ml/min. |
| 73 | 18 psi | 50 ml/min. |
| 23–24 | atoms. | 50 ml/min. |
| 74 | 2" mercury | 50 ml/min.* |
| 77 | 18 psi | 150 ml/min. |

*also 50 ml/min. air from open catcher

As in the previously described embodiment, flow through the bypass conduit 77 passes into the inlet of venturi 95 and induces the vacuum to withdraw ink from return conduit 74 back into the ink supply reservoir, via coupling 91*e* and the induction passage 106. It will be noted that the flow rate through the bypass line is about three times that of the flow rate through the print head and it is preferred, in accord with the present invention, that the bypass flow rate exceed the print head flow rate. This not only assures reliable withdrawal of ink from line 74 but enhances ink cleanliness by recirculatory filtering of a large portion of the ink in the system. Further, the large bypass flow rate enables the dynamic withdrawal force of the venturi to accommodate the air flow from the open catcher 30 and avoids a valve in line 75 and the control electronics to sequence the closing and opening of that line respectively during start-up and printing modes of operation.

After the ink pressure and temperature has reached operative condition, the valve 64 is closed and ink passes through the print head orifices into the sump 9*a* until stabilized flight into the catcher 30 is established. Ink from the sump returns by gravity through line 98 to the cartridge via coupling 91*d*.

After the ink stream have stabilized into the catcher 30, the following conditions exist in the circulation system:

| | Printing Mode | |
|---|---|---|
| Conduit | Pressure | Flow Rate |
| 71 | .4 psi | 200 ml/min. |
| 72 | 21 psi | 200 ml/min. |
| 78 | 21 psi | 18 ml/min. |
| 73 | 20 psi | 34 ml/min. |
| 23 | 10.5 psi | 34 ml/min. |
| 75 | 10" water | 34 ml/min.* |
| 96 | 25" water | 34 ml/min.* |
| 77 | 20 psi | 150 ml/min. |

*also 70 ml/min. air

Again the bypass flow through line 77 is substantially greater than the flow rate to the print and provides the motive force to induce withdrawal of the ink and air from the catcher along lines 75 and 74 into coupling 91*e* and induction passage 96 of the cartridge.

It will be appreciated that the approach of providing the venturi structure and induction passage in the ink cartridge itself not only simplifies the printer apparatus, but also avoids the necessity to clean or replace the venturi. That is the venturi structure can be fabricated cheaply by molding and still have a lifetime sufficient to operate reliably with the quantity of ink in its integral cartridge.

The invention has been described in detail with particular reference to preferred embodiments thereof, but it will be understood that variations and modifications can be effected within the spirit and scope of the invention.

What is claimed is:

1. For use with a continuous ink jet printing apparatus of the type having a print head assembly, an ink catcher assembly and ink circulating means including (i) a print head supply line, (ii) a print head bypass line, (iii) pump means for pumping ink through the supply and bypass lines and (iv) a catcher return line coupled to said catcher assembly, an ink cartridge comprising:

(a) means providing an ink supply reservoir;

(b) means for venting said reservoir to the atmosphere;

(c) an ink supply outlet which is detachably couplable to the pump means of such apparatus;

(d) a bypass line inlet which is detachably couplable to the bypass line of such apparatus;

(e) a catcher return inlet which is detachably couplable to the catcher return line of such apparatus; and (f) venturi means including an inlet, a restriction region extending from said inlet, an expansion region extending from said restriction region, an outlet from said expansion region to said reservoir and an induction passage coupled to said restriction region, said cartridge being constructed so that ink introduced respectively into said bypass line inlet is channeled into said venturi inlet and said induction passage of said cartridge is coupled to said catcher return inlet.

2. For use with a continuous ink jet printing apparatus of the type having a print head assembly, an ink catcher assembly and ink circulating means including (i) a print head supply line, (ii) a print head bypass line, (iii) pump means for pumping ink through the supply and bypass lines (iv) a print head return line and (v) a catcher, an ink cartridge comprising:

(a) means defining an ink supply reservoir;

(b) means for venting said supply region to substantially atmospheric pressure;

(c) an ink supply outlet which is couplable to the inlet of the pump means of such apparatus;

(d) a bypass line inlet which is couplable to the bypass line of such apparatus;

(e) an ink return line inlet which is detachably couplable to the catcher and/or print head return line of such apparatus; and (f) venturi means including an inlet, a restriction region, an expansion region, and outlet and an induction passage coupled to said restriction region, said cartridge being constructed so that ink introduced respectively into said bypass and return line inlets is channeled respectively to said venturi inlet and said induction passage of said cartridge.

3. The invention defined in claim 1 or 2 wherein said venturi means outlet is located to outlet ink above the level of the ink supply in said cartridge reservoir.

4. The invention defined in claim 1 or 2 wherein said cartridge includes an outlet filter means for filtering ink passing from the supply reservoir into said supply outlet.

5. The invention defined in claim 1 or 2 wherein said cartridge includes filter means for filtering ink passing from said return line inlet to said restriction region of said venturi means.

6. The invention defined in claim 1 or 2 wherein restriction and expansion regions and said induction passage of said venturi means are structurally isolated from said ink supply reservoir of said cartridge.

7. An ink cartridge adapted for insertion into a continuous ink jet printer, comprising wall means defining an ink reservoir region, means for venting said reservoir to the atmosphere outlet means for detachably coupling ink in said reservoir region to a printer supply line, and a first inlet means for detachable coupling to a positive pressure line of such a printer, a second inlet means for detachable coupling to an ink return line of such a printer and venturi means having (i) a restriction region located to receive ink from said first outlet means and (ii) an expansion region means defining an ink induction passage isolated from said reservoir region and extending from said venturi restriction region to said ink return inlet.

8. An ink cartridge adapted for insertion into a continuous ink jet printer, said cartridge comprising wall means defining an ink reservoir, means for venting said reservoir to the atmosphere, outlet means for coupling said reservoir to an ink supply line of such printer, venturi means having an inlet for coupling to a positive pressure ink line of such printer and an outlet to said ink reservoir, an ink return inlet for coupling to an ink return line of such a printer and means defining a ink induction passage from the restriction region of said venturi means to said cartridge ink return inlet.

9. The invention defined in claim 7 or 8 wherein the expansion region of said venturi means is strucurally extended to a location to outlet ink above the nominal full ink level in said cartridge reservoir.

10. The invention defined in claim 7 or 8 wherein said cartridge includes an outlet filter means for filtering ink passing from the ink reservoir into said outlet means.

11. The invention defined in claim 7 or 8 wherein said cartridge includes filter means for filtering ink during passage from said ink return inlet to said restriction region.

12. In continuous ink jet printing apparatus of the type having (i) print head for receiving ink at print head inlet and discharging ink through a print head outlet and/or through printing orifice means and (ii) catcher means for catching non-print ink from said orifice means, an improved ink circulation system comprising:

(a) ink supply means including a pump, a head supply conduit coupling the pump outlet to said print head and a pump supply conduit coupled to the pump inlet;

(b) an ink container having an ink supply region, means for venting said supply region to substantially atmospheric pressure, venturi means, including an inlet, a restriction region and an expansion region;

(c) a print head bypass conduit for diverting a portion of the flow from said head supply conduit to the inlet of said venturi means; and (d) an ink return conduit coupling the restriction region of said venturi means to said catcher and/or said print head outlet.

13. In ink jet printing apparatus of the type having (i) print head for receiving ink at an inlet and discharging ink streams through an orifice plate and (ii) catcher means for catching non-print ink, an improved ink supply and circulation system comprising:

(a) ink supply means including a pump, head supply conduit means for coupling the pump outlet to said print head and a pump intake conduit;

(b) an ink cartridge having a supply region, atmospheric venting means for said supply region, an integral venturi structure and a cartridge outlet detachably coupled to said pump intake conduit;

(c) bypass conduit means detachably coupling the positive pressure side of said ink supply means to the inlet of said cartridge venturi structure; and (d) an ink return conduit detachably coupling a restriction region of said venturi structure to said catcher means and/or said print head outlet.

14. The invention defined in claim 12 or 13 wherein both said catcher and print head outlets are coupled to said venturi means.

15. In continuous ink jet printing apparatus of the type having (i) print head for receiving ink at print head inlet and discharging ink through a print head outlet and/or through printing orifice means and (ii) catcher means for catching non-print ink from said orifice means, an improved ink circulation system adapted for cooperation with an ink cartridge having a supply reservoir, means for venting said reservoir, an ink outlet from said reservoir and an integral venturi means, said system comprising:

(a) ink supply means including a pump, a head supply conduit coupling the pump outlet to said print head and a pump supply conduit constructed to detachably couple the pump inlet to the ink outlet of such a cartridge;

(b) a print head bypass conduit constructed to detachably couple said head supply conduit to the inlet of the venturi means of such a cartridge; and (c) an ink return conduit constructed to detachably couple the restriction region of such cartridge venturi means to said catcher and/or said print head outlet.

16. In ink jet printing apparatus of the type having (i) print head for receiving ink at an inlet and discharging ink streams through an orifice plate and (ii) catcher means for catchiong non-print ink, (iii) a print head outlet and (iv) a sump for receiving ink during apparatus start-up, an improved ink supply and circulation system comprising:

(a) ink supply means including a pump, head supply conduit means for coupling the pump outlet to said print head and a pump intake conduit;

(b) an ink cartridge having an atmospheric vent, a venturi device, including an inlet, a restriction region and an expansion region, and a cartridge outlet detachably coupled to said pump intake conduit;

(c) bypass conduit means which detachably couples said ink supply means to the inlet of said cartridge venturi device; and (d) an ink return conduit detachably coupling the restriction region of said venturi means to said catcher means, said print head outlet and/or said pump.

* * * * *